(12) United States Patent
Ni

(10) Patent No.: US 8,232,504 B2
(45) Date of Patent: Jul. 31, 2012

(54) HIGH EFFICIENCY WELDING DEVICE

(76) Inventor: Xue Feng Ni, Richmond Hill (CA)

( * ) Notice: Subject to any disclaimer, the term of this patent is extended or adjusted under 35 U.S.C. 154(b) by 372 days.

(21) Appl. No.: 12/659,711

(22) Filed: Mar. 18, 2010

(65) Prior Publication Data

US 2011/0226750 A1  Sep. 22, 2011

(51) Int. Cl.
*B23K 9/133* (2006.01)
(52) U.S. Cl. ............. 219/137.31; 219/137.61; 219/138; 219/145.23
(58) Field of Classification Search .................. 219/136, 219/138, 137.31, 137.2, 137.61, 137.9, 145.23, 219/145.3, 73.11, 73.14
See application file for complete search history.

(56) References Cited

U.S. PATENT DOCUMENTS 5,603,855 A * 2/1997 Ni ............................. 219/137.31
7,115,835 B1 * 10/2006 Jiang .......................... 219/137.2

* cited by examiner

*Primary Examiner* — Dung A. Le
(74) *Attorney, Agent, or Firm* — David W. Wong

(57) ABSTRACT

The high efficiency welding device has two pairs of clamps mounted in two pairs of sliders movable in a reciprocating movement relative to one another. One pair of sliders is mounted at 0 and 180 degree positions around the circumferential surface of a support block and the other pair of sliders is mounted at 90 and 270 degree positions. Each pair of clamps is in the close condition while moving forward in the reciprocating movement to clamp onto selected air gaps of the welding electrode to advance the electrode towards the work piece as well as delivering the welding current to the welding operation, and it is in the open condition releasing the grasp of the welding electrode while moving backward.

11 Claims, 3 Drawing Sheets

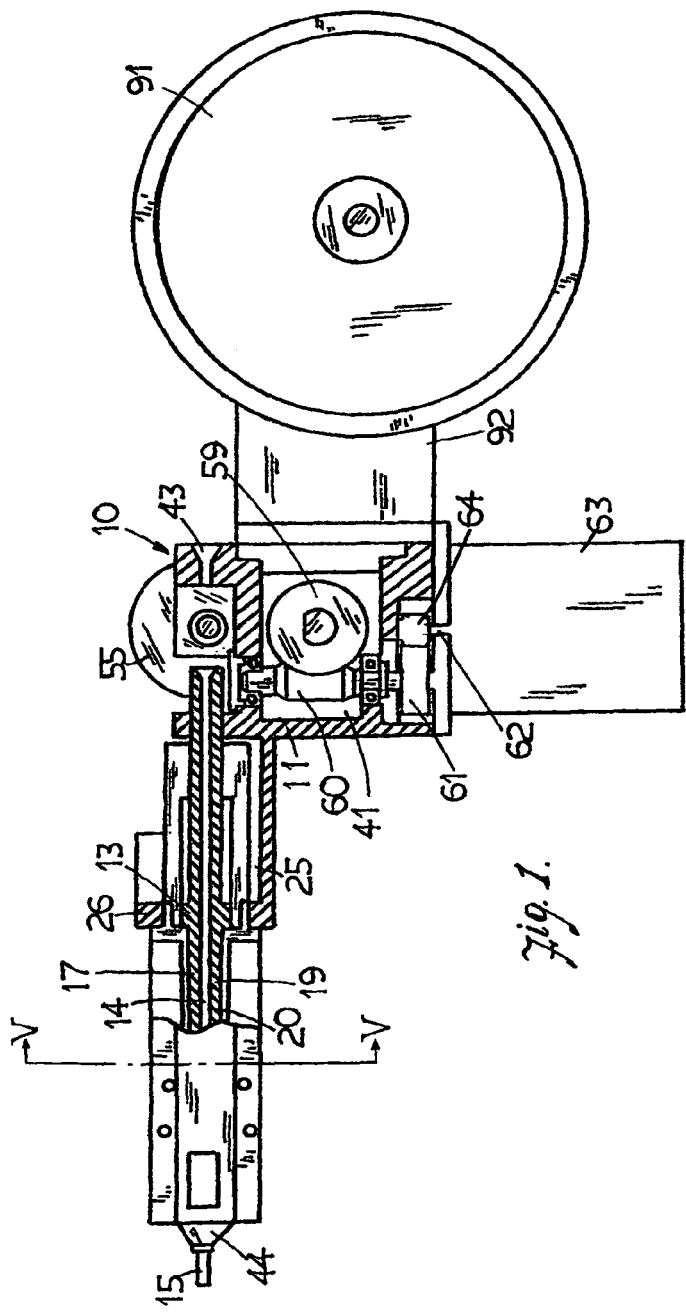
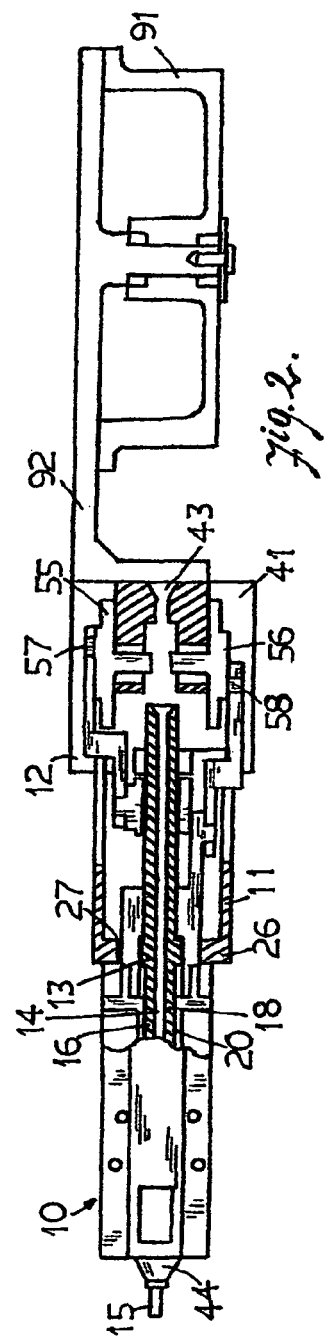

HIGH EFFICIENCY WELDING DEVICE

BACKGROUND OF THE INVENTION

1. Field of the Invention

This invention relates to a high efficiency welding device for use with a continuous welding electrode. The device delivers the electrode towards the work piece to be welded with high welding current efficiency and precision.

2. Background of the Invention

A continuous welding electrode consists of a continuous metal core coated with a welding flux, and air gaps are formed on the flux coating in evenly spaced intervals. The metal core is exposed through the air gaps such that the electrode may be advanced with a welding device, commonly called a welding gun which has continuously moving carriers engaging with the air gaps for moving the electrode towards the working piece as well as for delivering the welding current to the metal core through the exposed air gaps. A welding operation may be continuously carried out with the welding current efficiently provided so as to produce a high quality continuous, strong, consistent, and smooth weld. Presently in welding guns, the carriers are in the form of a series of evenly spaced carriages driven with a continuous chain, belt or similar means for advancing the welding electrode forward towards the work piece as well as for delivering the welding current to the metal core through the exposed air gaps. Such construction is relatively complex in construction and the carriages are prone to jamming.

A welding gun as shown in U.S. Pat. No. 7,115,835 shows a welding gun having two reciprocating carriages located on two opposite sides of the electrode. The carriages move back and forth with respect to one another. Each carriage has a pair of clamping jaws which engage with consecutive neighboring air gaps. During the advancing of the welding electrode, one pair of the clamping jaws of a first carriage grasp the electrode at an air gap at its two opposite sides to move the electrode forward while the clamping jaws of the second carriage is opened to move backward to the position of the next air gaps. This action operates continuously and alternately for advancing the electrode forward and to supply the welding current the metal core of the electrode through the closed clamping jaws. The clamping jaws of the carriages only engage with two directly opposite sides of the electrode in a 180° plane. If the distance between the clamping jaws of the first carriage and the second carriage is "L"; and the distance between the air gaps in the electrode flux coating is "l", in order for the system to operate properly the distance L must necessarily be larger than 2l. Thus, the welding current is only supplied to the metal core through a 2l distance or the length of the welding electrode from the work piece. The length of welding electrode contributes to a higher current resistance in reducing the efficiency of the current provided to the welding operation. Furthermore, longer carriages and driving system must be provided in the welding gun, which inherently increases the weight of the welding gun such that the gun must be held and operated awkwardly with two hands.

SUMMARY OF THE INVENTION

It is a principal object of the present invention to provide a welding device which drives the continuous welding electrode accurately and delivers the welding current to the welding operation with high efficiency.

It is an object of the present invention in providing two pairs of electrode driving means located in four positions in 360 degrees around the electrode to drive the electrode with high accuracy and efficiency.

It is an object of the present invention to provide a welding device which delivers the welding current to the continuous welding electrode efficiently with a minimum amount of resistance current loss.

It is another object of the present invention to provide a welding device which has a relatively light weight such that it can be handled with ease with one hand by the operator in the welding operation.

It is yet another object of the present invention to provide a welding device with relatively simple construction to minimize mechanical losses.

BRIEF DESCRIPTION OF THE DRAWINGS

Other objects and advantages of the present invention will become apparent from the following detailed description of the preferred embodiments thereof in connection with the accompany drawings, in which FIG. 1 is a perspective side elevation view of the welding device of the present invention with portions of the outer enclosure removed to show the driving system having two reciprocating bifurcated linkages.

FIG. 2 is a perspective partial sectional top elevation view of FIG. 1.

DETAILED DESCRIPTION OF THE PREFERRED EMBODIMENTS

Figure 5:
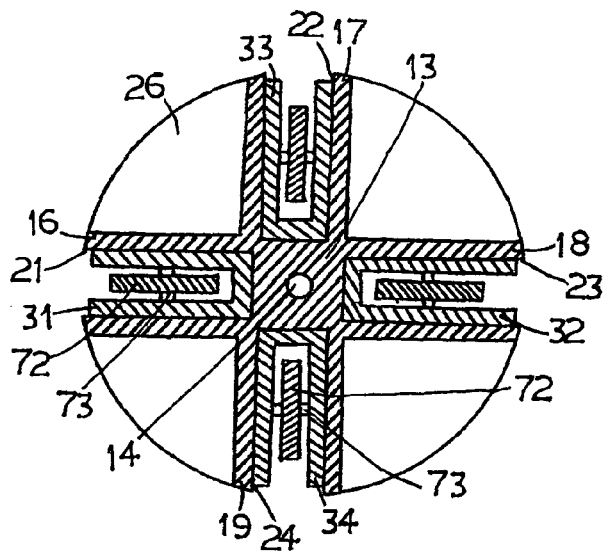
FIG. 5 is an isolated enlarged front cross sectional elevation view along section line V-V of FIG. 1 showing the four sliders slidably mounted in the four channels of four tracks located at 0, 90, 180 and 270 degree positions around the outer surface of the support block forming a cross sectional cross shape. One pair of the tracks lie in a first plane and the other pair lie in a second plane perpendicular to the first plane as well as the longitudinal axis of the support block.

With reference to the drawings in which like reference numerals designate corresponding parts in the different views, the welding device 10 of the present invention has a main body 11 mounted within an outer enclosure 12. An elongated support block 13 as shown in the exemplary embodiment having a cylindrical cross shape cross section as best shown in FIG. 5 is located at the front portion of the main body 11. It can be understood by those skilled in the art that the support block may have a square cross sectional shape for providing the same function. A central opening 14 extending throughout the longitudinal axis of the support block 13 for guiding the continuous welding electrode 15 to pass through the device 10. The support block 13 has four elongated rectangular tracks 16, 17, 18, and 19 located at 0, 90, 180 and 270 positions with respect to one another around the circumferential surface of its front portion 20. Thus, the rectangular tracks 16, 17, 18 and 19 lie in two planes perpendicular to one another as well as perpendicular to the longitudinal axis of the support block 13. For the exemplary embodiment, tracks 16 and 18 are located in the horizontal plane and the tracks 17 and 19 are located in the vertical plane. The tracks 16, 17, 18 and 19 extend throughout the entire length of front portion 20 the support block 13. The tracks 16, 17, 18 and 19 have a U-shaped cross sectional shape with closed rear end channels 21, 22, 23 and 24 formed therein respectively.

Figure 3:
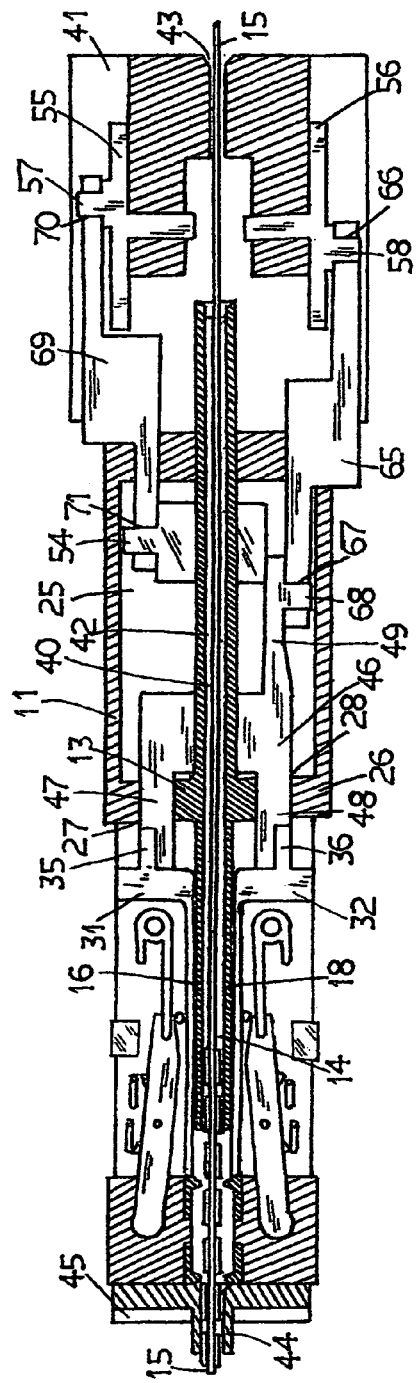
FIG. 3 is a perspective partial cross sectional top elevation view of the welding device of the present invention showing a first pair of sliders located in a first plane perpendicular to the longitudinal axis of the main body of the device and two clamping jaws are mounted at the front end of two pivotal arms located in the sliders for driving the welding electrode and providing welding current to the work piece.
Figure 4:
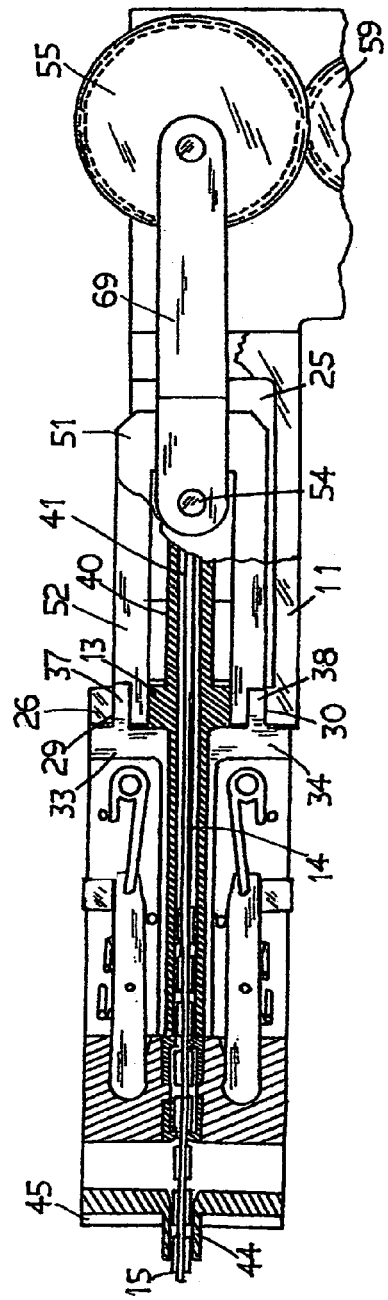
FIG. 4 is a perspective partial cross sectional side elevation view of the welding device showing the second pair of reciprocating sliders located in a second plane which is perpendicular to the first plane and is also perpendicular to the longitudinal axis of the main body of the device and a second pair of clamping jaws are provided for alternately driving the welding electrode.

The channels 21, 22, 23 and 24 are separated from a middle chamber 25 of the main body 11 by a partition wall 26. A first rear opening 27 is formed at the center of the portion of the partition wall 26 forming the rear wall of the channel 21. A second rear opening 28 is formed at the center of the portion of the partition wall 26 forming the rear wall of the channel 23 as best shown in FIG. 3. Similarly, a third rear opening 29 is formed at the center of the portion of the partition wall 26 forming the rear wall of the channel 22, and a fourth rear opening 30 is formed at the center of the portion of the partition wall 26 forming the rear wall of the channel 24 as shown in FIG. 4.

A first slider 31 having a cross sectional U shape with open top and front, is slidably located in the channel 21, a second slider 32 having a similar U shape, is slidably located in the channel 23, a third slider 33 having a similar U shape is slidably located in the channel 22, and a fourth slider 34 having a similar U shape, is slidably located in the channel 24. A first connecting arm 35 is formed on the rear wall of the first slider 31 and it is extendable through the first rear opening 27 of the channel 21 into the middle chamber 25. A second connecting arm 36 is formed on the rear wall of the slider 32 and it is extendable through the second r rear opening 28 into the middle chamber 25. A third connecting arm 37 formed on the rear wall of the slider 33 and it is extendable through the opening 29 into the middle chamber 25, and a fourth connecting arm 38 formed on the rear wall of the slider 34 and it is extendable through the opening 30 into the middle chamber 25.

An elongated guide tube 40 integrally formed on the support block 13 and extending throughout the longitudinal axis of the support block 13 in a cantilever manner from the rear end of the support block 13 through the middle chamber 25 to the rear chamber 41 of the device 10. The guide tube 40 has a center opening 42 aligned with the central opening 14 of the support block 13. The welding electrode 15 passes through the middle chamber 25 and the rear chamber 41 through the elongated guide tube 40. The welding electrode 15 enters the rear chamber 41 of the welding device through an inlet opening 43 formed in the support frame mounted in the rear chamber 41 as best shown in FIG. 3, and it passes through a short exit tube 44 mounted in the front end cover support 45 of the device 10 to be delivered to the work piece.

As best shown in FIG. 3, a Y-shaped coupling member 46 is located in the middle chamber 25. The Y-shaped coupling member 46 has bifurcated arms 47 and 48 and a leg portion 49. The arm 47 is extendable slidably through the opening 27 and it is connected to the connecting arm 35 of the slider 31, and the arm 48 is extendable slidably through the opening 28 and it is connected to the connecting arm 36 of the slider 32. The Y-shaped coupling member 46 is movable in a back and forth manner for pulling and pushing the sliders 31 and 32 therewith in a reciprocating manner. A coupling pin 50 is formed on the end portion of the leg portion 49 of the Y-shaped coupling member 46. Similarly, as best shown in FIG. 4, a U-shaped coupling member 51 is located in the middle chamber 25. The U-shaped coupling member 51 has bifurcated arms 52 and 53. The arm 52 is extendable slidably through the opening 29, and it is connected to the connecting arm 37 of the slider 33. The arm 53 is extendable slidably through opening 30 and it is connected to the connecting arm 38 of the slider 34. The U-shaped coupling member 51 is movable in a back and forth manner for pulling and pushing the sliders 33 and 34 therewith in a reciprocating manner. A coupling pin 54 is formed on the cross bar portion of the U-shaped coupling member 51.

As shown in FIG. 2, two rotary wheels 55 and 56 are rotatably mounted on the rear portion of the main body 11 of the device 10. The rotary wheel 55 has an off-center coupling pin 57 formed on its surface and the rotary wheel 56 also has an off center coupling pin 58 formed on its surface. The positions of the off-center coupling pin 57 and the off-center coupling pin 58 are 180 degree out of phase with respect to one another. The rotary wheels 55 and 56 are rotatably coupled to a drive wheels 59 rotatable by a worm shaft 60. The worm shaft 60 is mounted on a second rotary wheel 61 which is rotatably coupled to the rotary shaft 62 of a drive motor 63 by a drive gear 64. Thus, the operation of the drive motor 63 causes the rotary wheels 55 and 56 to rotate accordingly.

A first S-shaped connecting bar 65 having a first bearing opening 66 formed at a rear end portion and a second bearing opening 67 formed at a front end therein and it is located in the middle chamber 25. The first bearing opening 66 of the first S-shaped connecting bar 65 is slidably engaged with the off-center coupling pin 58 of the rotary wheel 56. The second bearing opening 67 of the first S-shaped connecting bar 65 is slidably engaged with the coupling pin 68 provided on the leg portion 49 of the Y-shaped coupling member 46. Thus, rotation of the rotary wheel 56 will cause the first S-shaped bar 65 to pull and push the sliders 31 and 32 located in the 0 and 180 positions of the horizontal plane of the cylindrical block 13 to move back and forth in a reciprocating manner accordingly. The horizontal sliders 31 and 32 are pushed to the front position as shown in FIG. 3.

A second S-shaped bar 69 having a first bearing opening 70 formed at a rear end portion and a second bearing opening 71 formed at a front end portion therein is also located in the middle chamber 25. The first bearing opening 70 of the second S-shaped bar 69 is slidably engageable with the off-center coupling pin 57 of the rotary wheel 55, and the second bearing opening 71 is slidably engageable with a coupling pin 54 formed at the cross portion of the U-shaped coupling member 51. Thus, rotation of the rotary wheel 55 will cause the second S-shaped bar 69 to pull and push the sliders 33 and 34 located in the 90 and 270 degree positions of the vertical plane of the cylindrical block 13 to move back and forth in a reciprocating manner accordingly. The vertical sliders 33 and 34 are pulled to a rear position as shown in FIG. 4. The positions of the pair of horizontal sliders and the pair of vertical sliders will alternately move to the front and rear positions opposite to one another in the reciprocating movement.

The welding electrode 15 is driven through the front portion 11 of the welding device 10 of the present invention to the welding work piece by two pairs of clamping assemblies. One pair is provided by the horizontal sliders 31 and 32, and the other pair by the vertical sliders 33 and 34. All clamping assemblies have the similar construction, and for simplicity of illustration, one clamping assembly in the horizontal slider and the vertical slider are described below as representatives.

Figure 6:
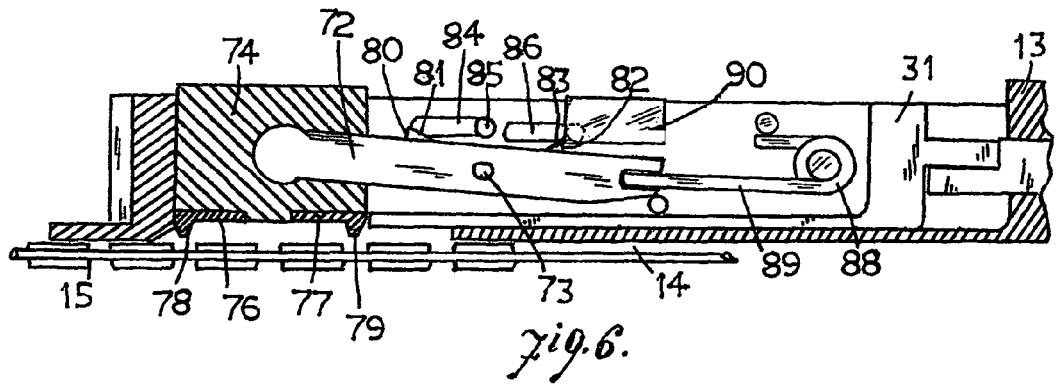
FIG. 6 is an enlarged isolated view of one half of the welding electrode clamping assembly of FIG. 4 consisting of one slider and pivotal bar illustrating its operation.
Figure 7:
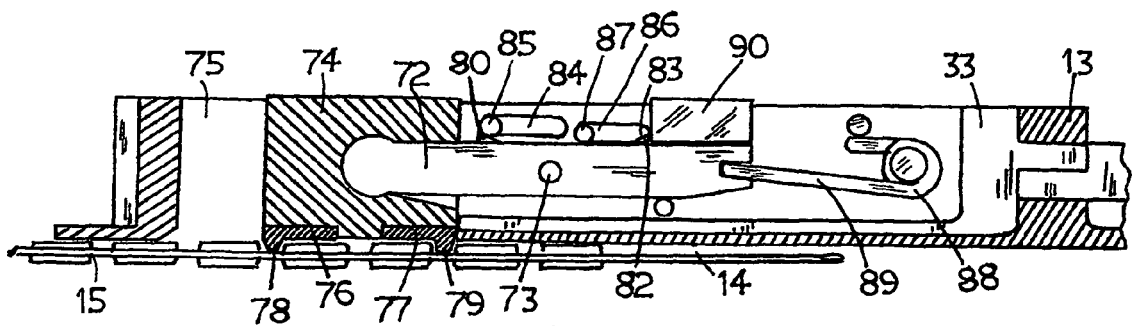
FIG. 7 is an enlarged isolated view of one half of the welding electrode clamping assembly of FIG. 5 consisting of one slider and pivotal bar illustrating its operation.

As shown in FIGS. 3 and 4 and also in the enlarged views of one half of the clamping assembly in the horizontal slider is shown in FIG. 6 and one half of the clamping assembly in the vertical slider is shown in FIG. 7. Each slider 31, 32, 33 and 34 has a pivotal bar 72 pivotally mounted therein with a mounting pin 73 extending transversely through the side walls of the slider. The front portion of the pivotal bar 72 extends beyond the front end of the slider with a rectangular rocker cap 74 mounted thereon. The front end of the rocker cap 74 is spaced from the inner side wall of the front end cover support 45 of the device by a space 75 having a length equal to the length of one welding flux section and an air gap when the slider is at a retracted rear position abutting the rear wall of the track as shown in FIG. 7 so that the clamping assembly is slidably movable relative to the track for a distance equal to this space. Two L-shaped clamping plates 76 and 77 are mounted at two opposite end edge portions of the inner edge of the rocker cap 74 facing the portion of the welding electrode 15 exposed in the space between the front end of the slider and the inside surface of the front end cover support 45. The teeth 78 and 79 of the clamping plates are spaced from one another in a distance equal to the distance between three air gaps of the welding electrode.

A front triangular abutment 80 is formed on the outer edge of the pivotal bar 72 and located adjacent to the open edge of the slider. The front triangular abutment 80 protrudes outwards from the outer edge of the pivotal bar 72 and it has a contact slope 81 slanting downwardly rearward towards the rear end of the pivotal bar 72. A rear triangular abutment 82 also formed on the outer edge of the pivotal bar 72 and spaced from the front triangular abutment 80. The rear triangular abutment 82 has a sloping edge 83 slanting downward towards the front end of the pivotal bar 72. A front slide slot opening 84 is formed on the side wall of the slider and it extends parallel to the outer edge of the slider and has a length equal to the length of the space 75. A front abutment pin 85 is mountable to the side wall of the slider and it extends transversely through the front slide slot opening 84. The front abutment pin 85 will contact the sloping edge 81 of the front triangular abutment 80 when the slider is moving to the rear position in the track in the reciprocating movement as shown in FIG. 7. The contact of the sloping edge 81 of the front abutment 80 with the front abutment pin 85 would cause the front end of the pivotal bar 72 to tilt downward such that the teeth 78 and 79 of the clamping plates 76 and 77 will be urged to clamp against the air gaps of the welding electrode. A rear slide slot opening 86 is also formed on the side wall of the slider, which is parallel and spaced from the front slide slot opening 84. The rear slide slot opening 86 is equal in length to that of the front slide slot opening 84. A rear abutment pin 87 is mounted on the side wall of the slider and it extends transversely through the rear slide slot opening 86. The rear abutment pin 87 will contact the sloping edge 83 of the rear triangular abutment 82 when the slider is moving to the front of the track in the reciprocating movement as shown in FIG. 6. The contact between the rear abutment pin 87 with the sloping edge 83 of the rear triangular abutment 82 would cause the rear end of the pivotal bar 72 to tilt downward so that the teeth 78 and 79 would move away from the welding electrode. A torsion spring 88 is located in the slider. The pivotal arm 89 of the torsion spring 88 is mounted to the rear end of the pivotal bar 72 such that it normally exerts a pivotally force for tilting the rear end of the pivotal bar 72 downward to release the teeth 78 and 79 of the clamping plates 76 and 77 from the welding electrode. A magnet 90 is mounted in the outer edge portion of the slider and located above the rear end of the pivotal bar 72. The magnet 90 will retain the rear end of the pivotal bar 72 to contact therewith by magnetic force when the rear end of the pivotal bar 72 is tilted towards the outer edge of the slider. The magnet also provides the clamping force for clamping the teeth of the clamping plates tightly on the metal core of the welding electrode through the air gaps.

The reciprocating movement of the coupling members 47 and 51 will cause the pair of sliders 31 and 32 to move alternately to the front and rear positions in their tracks while the pair of sliders 33 and 34 will move alternately to the front and rear positions opposite to that of the sliders 31 and 32. FIG. 3 shows the sliders 31 and 32 have just moved to the front position in the tracks 13 and 14, and the sloping edge 83 of the rear triangular abutment 82 has already contacted the rear abutment pin 87 in the forward movement of the sliders 31 and 32 to cause the rear end of the pivotal bar 72 in both sliders 31 and 32 to separate from the magnet 90. As soon as the rear end of the pivotal bar 72 is separated from the magnet 90, the torsion springs 90 in the sliders 31 and 32 would tilted the rear end of the pivotal bars 72 in both sliders 31 and 32 downward to release clamping teeth of the pivotal bar 72 from the welding electrode. In this position, the sliders 31 and 32 are ready for moving backward to the rear position in their reciprocating movement. In the meantime, the sliders 33 and 34 in the 90 and 270 degree positions have moved to the rear position as shown in FIG. 4. The sloping edge 81 of the front triangular abutment 80 has contacted the front abutment pin 85 when the sliders were moving backwards to the rear position; and the front triangular abutment 80 had forced the front portion of the pivotal bar 72 to tilt downwards with the clamping teeth 78 and 79 clamping onto three consecutive air gaps of the welding electrode 15. The rear end portion of the pivotal bar 72 is tilted upwards it would be attracted by the magnetic force of the magnet 90 to retain it in place so as to provide the clamping force for closing the clamping teeth 78 and 79 of the pivotal bars in the sliders 33 and 34 onto the air gaps of the welding electrode 15. In this position, the sliders 33 and 34 are ready for moving forwards in their reciprocating movement for advancing the welding electrode forward as well as conducting the welding current to the welding electrode. In the above manner, the clamping teeth 78 and 79 of the sliders moving forwards in the reciprocating movement would grasp the welding electrode tightly to advance it forward towards the welding work piece as well as would provide the welding current through the metal core of the welding electrode, the clamping teeth 78 and 79 of the sliders moving rearwards in the reciprocating movement are released from the grasp of the welding electrode to enable the sliders to move to the next rear position.

A rotatable round hub 91 is removably mounted with a bracket 92 at the rear of the device 10 as best shown in FIG. 1. The continuous welding electrode 15 may be wound on a carrier wheel which can be slidably mounted to the hub 91. The welding electrode 15 may be easily replenished by replacing a spent carrier wheel with a new carrier wheel with a full amount of continuous welding electrode wound thereon.

While the preferred embodiments of the invention have been described above, it will be recognized and understood that various modifications may be made therein and the appended claims are intended to cover all such modifications which may fall within the spirit and scope of the invention.

What is claimed is:

1. A high efficiency welding device for a continuous welding electrode having equal length welding flux coating sections separated by evenly spaced consecutive air gaps exposing a metal core within said electrode, comprising:

two pairs of clamps mounted within two pairs of sliders, a first pair of said sliders being slidably mounted within first two tracks formed on a circumferential outer surface of an elongated support block, said first two tracks being located directly opposite to one another and lying in a first plane perpendicular to the longitudinal axis of said support block, a second pair of said sliders being slidably mounted within second two tracks formed on said outer surface of said elongated support block, said second two tracks being located directly opposite to one another and lying in a second plane perpendicular to both said first plane and the longitudinal axis of said support block;

a central opening formed in the longitudinal axis of said support block operative for receiving said continuous welding electrode to pass through said device;

two coupling members movable in a back and forth reciprocating movement relative to one another, one coupling member being connected to said first pair of sliders and a second coupling member being connected to said second pair of sliders;

first pair of clamps of said two pairs of clamps being located in said first pair of sliders, and a second pair of clamps of said two pairs of clamps being located in said second pair of sliders, said first pair of clamps and said second pair of clamps being located alternately at a front position and rear position relative to one another in said reciprocating movement, and alternately grasping on said welding electrode while moving forward to said front position, and releasing the grasp on said welding electrode while moving rearward to said rear position.

2. A high efficiency welding device according to claim 1 wherein said support block with said track formed thereon has a cross sectional cross shape with said first two tracks located at 0 and 180 degree positions of said circumferential surface of said support block and said second two tracks located at 90 and 270 degree positions of said circumferential surface of said support block.

3. A high efficiency welding device according to claim 2 wherein each of said first pair of clamps and said second pair of clamps includes a pivotal bar pivotally mounted within each of said first pair of sliders and said second pair of sliders, a rectangular rocker cap mounted at a front end of said pivotal bar extending outside of a front end of said slider, clamping teeth mounted on an inner edge of said rocker cap, said clamping teeth of said first pair of clamps and said second pair of clamps being facing one another and operative to grasp said welding electrode between three air gaps for advancing said welding electrode.

4. A high efficiency welding device according to claim 3 including a torsion spring located within each of said first pair of sliders and said second pair of sliders, said torsion spring having a pivotal arm mounted to a rear end of said pivotal bar and operative to exert a pivotal force for normally tilting said clamping teeth of said clamps to an opened condition, a magnet mounted in a spaced manner above said rear end of said pivotal bar and operative to retain said rear end of said pivotal bar to contact therewith by magnetic force for maintaining said clamping teeth of said clamps in a closed condition grasping onto said welding electrode.

5. A high efficiency welding device according to claim 4 including a front triangular abutment protrusion and a rear triangular abutment protrusion formed on an outer edge of said pivotal bar, said front triangular abutment protrusion having a rearward sloping edge sloping downward and rearward relative to said outer edge, and said rear triangular abutment protrusion having a forward sloping edge sloping downward and forward relative to said outer edge, a front slide slot formed on side walls of said slider and a rear slide slot formed on said side walls and located spaced from said front slide slot, a front abutment pin extending slidably in a transverse manner in said front slide slot and being movable slidably with respect to said front slide slot and a rear abutment pin extending slidably in a transverse manner in said rear slider slot and also being movable slidably with respect to said rear slide slot, said front abutment pin being engageable in contact with said rearward sloping edge of said front triangular abutment protrusion when said slider is located at a rear position in the track for tilting said teeth of said clamp to grasp said welding electrode during forward movement of said slider in said reciprocating movement, said rear abutment pin being engageable in contact with said forward sloping edge of said rear triangular abutment protrusion when said slider is located at a front position in the track for tilting said teeth of said clamp to said opened condition for releasing the grasp from said welding electrode during rearward movement of said slider in said reciprocating movement.

6. A high efficiency welding device for a continuous welding electrode having equal length welding flux coating sections separated by evenly spaced consecutive air gaps exposing a metal core within said electrode, comprising:

a support block mounted at a front end portion of said device, said support block having a cross-shape cross sectional shape with four U-shaped tracks formed around circumferential surface of said support block at 0, 90, 180 and 270 positions and extending the entire longitudinal length thereof, said tracks at said 0 and 180 positions being located in a first plane perpendicular to the longitudinal axis of said block, said tracks at said 90 and 270 positions being located in a second plane perpendicular to the longitudinal axis of said block as well as perpendicular to said first plane;

a central through opening extending throughout the entire longitudinal center axis of said support block and operative for said welding electrode to pass therethrough in said device, a U-shaped slider slidably mounted in each of said four U-shaped tracks, said slider being movable in a reciprocating movement with respect to each respective track, and said slider in the tracks at said 0 and 180 positions being moved in an opposite direction to said slider in the tracks at said 90 and 270 positions;

two coupling members movable in a back and forth reciprocating movement relative to one another, one coupling member being connected to a first pair of sliders at said 0 and 180 positions, and a second coupling member being connected to a second pair of sliders at said 90 and 270 positions;

clamping means mounted in said slider, said clamping means being in a closed condition for grasping said welding electrode during forward movement of said slider to a front position, and being in an opened condition releasing from said welding electrode during rearward movement of said slider to a rear position, said clamping means in said first pair of sliders and said second pair slider being in said closed condition and opened condition alternately opposite to one another during reciprocating movement of said first pair of sliders and said second pair of sliders.

7. A high efficiency welding device according to claim 6 wherein said clamping means includes a pivotal bar pivotally mounted within each of said first pair of sliders and said second pair of sliders, a rocker cap mounted at a front end of said pivotal bar extending beyond a front end of each of said sliders, clamping teeth mounted on an inner edge of said rocker cap, said clamping teeth on said pivotal bar in said first pair of sliders forming a first clamp located in one plane perpendicular to said welding electrode and said clamping teeth on said pivotal bar in said second pair of sliders forming a second clamp located at a second plane perpendicular to said welding electrode and said one plane.

8. A high efficiency welding device according to claim 7 including a torsion spring located within each of said first pair of sliders and said second pair of sliders, said torsion spring having a pivot arm mounted to rear end of said pivotal bar and operative to exert a pivotal force for normally tilting said clamping teeth of said clamps to an opened condition, a magnet mounted in a spaced manner above said rear end of said pivotal bar and operative to retain said rear end of said pivotal bar to contact therewith by magnetic force for maintaining said clamping teeth of said clamps in a closed condition grasping onto said welding electrode.

9. A high efficiency welding device according to claim 8 including a front triangular abutment protrusion and a rear triangular abutment protrusion formed on an outer side edge of said pivotal bar, said front triangular abutment protrusion having a rearward sloping edge sloping downward and rearward relative to said outer side edge, and said rear triangular abutment protrusion having a forward sloping edge sloping downward and forward relative to said outer side edge of said pivotal bar, a front slide slot formed on side walls of said slider and a rear slide slot also formed on said side walls and located spaced from a rear end of said front slide slot, a front abutment pin extending slidably in a transverse manner in said front slide slot and being movable slidably with respect to said front slide slot, a rear abutment pin extending slidably in a transverse manner in said rear slide slot and movable slidably in said rear slide slot, said front abutment pin being engageable in contact with said rearward sloping edge of said front triangular abutment protrusion when the slider is located at a rear position in the track for tilting said teeth of said clamp to the closed position grasping on said welding electrode during forward movement of said slider in said reciprocating movement, said rear abutment pin being engageable in contact with said forward sloping edge of said rear triangular abutment protrusion when said slider is located at a front position in the track for tilting said teeth of said clamp to said opened condition for releasing from said welding electrode during rearward movement of the slider in the reciprocating movement.

10. A high efficiency welding device according to claim 9 including two rotary wheels rotatably mounted in a rear chamber of said device, a first one of said rotary wheels having a first off center mounting pin formed on a rotary surface, and a second one of said rotary wheels having a second off center mounting pin formed on a rotary surface, said first off center mounting pin and said second off center mounting pin being 180 out of phase with one another, said one coupling member being connected to said first off center mounting pin and said second coupling member being connected to said second off center mounting pin whereby rotation movement of said rotary wheels causes said first coupling member and said second coupling member to move in reciprocating movements opposite to one another.

11. A high efficiency welding device according to claim 10 including a rotatable round hub mounted to a rear end of said device with a mounting bracket, said hub being operative for receiving a wheel of continuous welding electrode removably mounted thereo.

* * * * *